Patented July 11, 1933

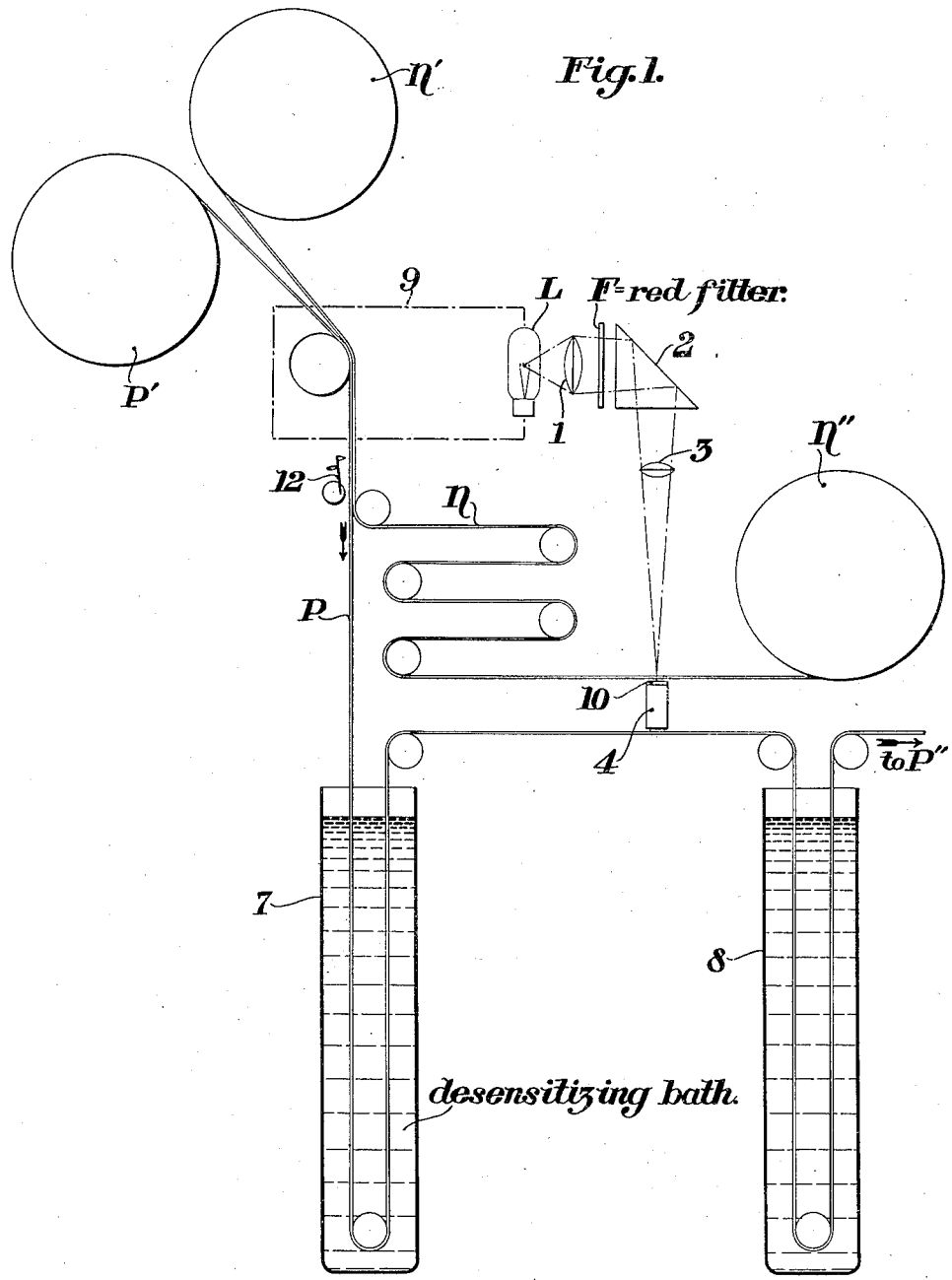

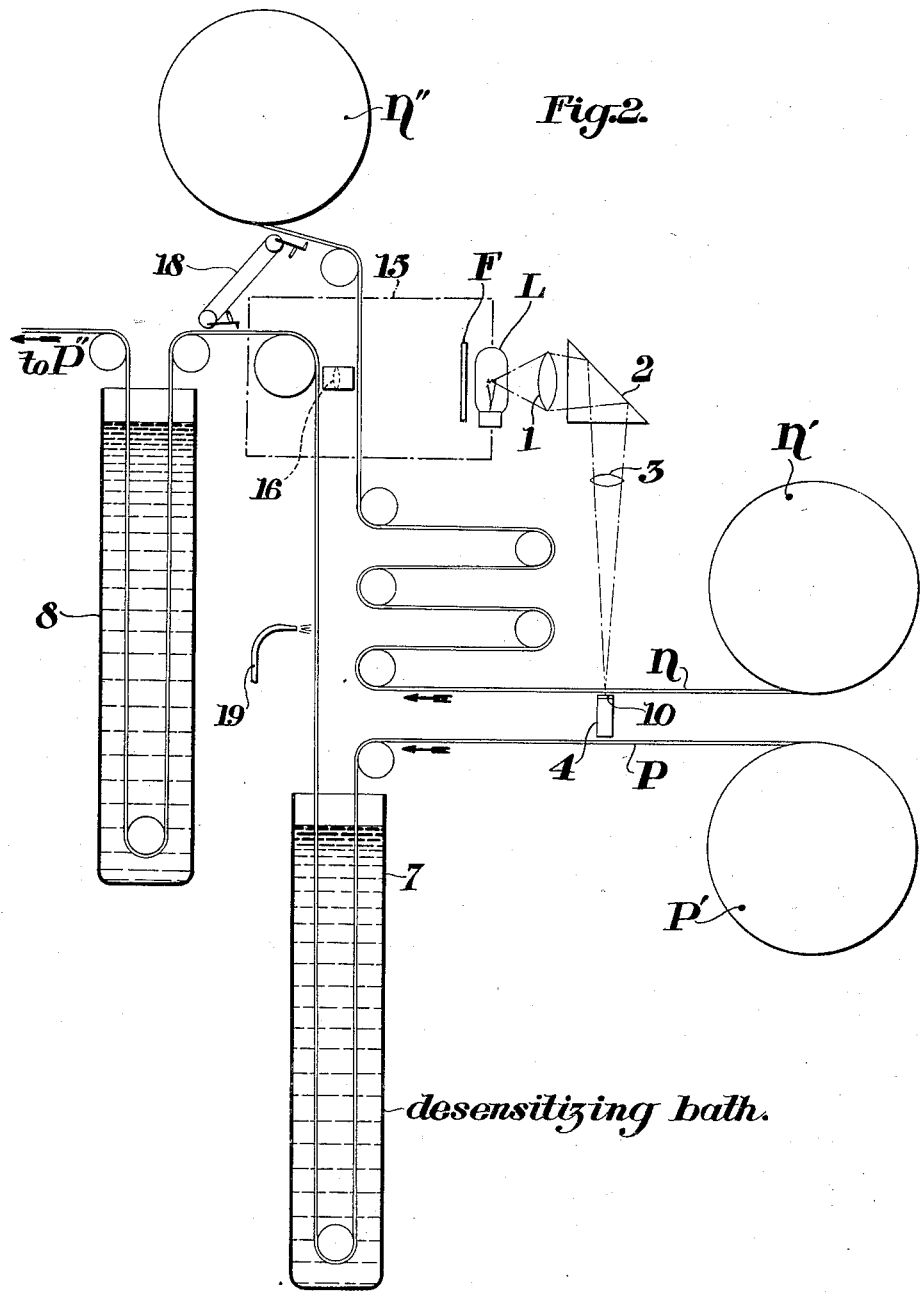

1,917,360

UNITED STATES PATENT OFFICE

JOHN G. CAPSTAFF, OF ROCHESTER, NEW YORK, ASSIGNOR TO EASTMAN KODAK COMPANY, OF ROCHESTER, NEW YORK, A CORPORATION OF NEW YORK

FILM PRINTING

Application filed April 22, 1931. Serial No. 532,030.

This invention relates to a method and means for printing photographic film on another film, and more particularly relates to to the automatic control of the exposure in a film printing method. It will be obvious that the invention is particularly adapted to the printing of motion picture film, but it will be useful in any case where a transparent film band bearing images is to be printed on another film.

The automatic control of printing exposures in various types of printing machines has been used hitherto. A number of such machines have been made which use integrated light from the film being printed to control the exposure. Most of these printers as previously used have involved moving shutters or vanes, optical wedges, or electrical devices such as thermopiles or photo-electric cells. While these elements may be satisfactory, they have the disadvantage that a certain amount of care is required to keep them in working order.

It is known also that a latent image produced by a white light exposure may be removed or reduced by desensitizing and then exposing to red light before developing.

It is an object of this invention to provide a printer of greater simplicity, and lower cost, and one that omits entirely the elements, either optical or electrical, which are liable to function imperfectly unless continually cared for. In the present invention the film being printed automatically controls the density of the print made from it, and is made to compensate for its own difference in density. A single lamp burning at constant brightness may be employed, without any interposed shutters or wedges.

My invention utilizes the well known property of red light, of bleaching a desensitized exposed film, and results in giving a final controlled developable exposure to the film, providing further a method for making this control practically automatic.

I first expose the film to actinic light, pass it through a desensitizing bath, and then expose it to the bleaching action of red light, the amount of red light affecting the film being controlled by the density of the film from which the print is made.

By the term "actinic light", as used herein, I mean light of such wave lengths as render the emulsion developable. This term accordingly embraces, as it does in the ordinary photographic literature, largely the shorter wave lengths of the spectrum such as violet, blue, and blue-green. A "non-actinic" light will be one involving the longer wave lengths of the spectrum to which most films are relatively insensitive. These wave lengths will be the yellow, orange, and red. For the purposes of my invention, however, I use red light such as that, for example, transmitted by the Wratten and Wainwright A filter, which transmits none of the wave lengths shorter than about 590 $\mu\mu$.

While I have illustrated my invention with the use of red light, and particularly that transmitted by the filter just mentioned, I wish it understood, however, that I include in the term "non-actinic" light the light of any color which exhibits the so-called Herschel effect, that is, shows the effect of bleaching a latent image formed by a previous exposure. When, therefore, in the specification I use the term red light, it is possible, for example, that an orange or even a yellow light would serve the purpose under certain conditions. Infra-red is also included, though it is, of course, not visible light.

Reference is made to the drawings in which:

Figure 1 is a vertical cross-section showing one embodiment of my invention.

Figure 2 is a vertical cross-section showing another arrangement for carrying out a variation of the process.

The operation of the invention will first be illustrated with a case of printing negative motion picture film on to a positive motion picture film, but it is understood that the invention is not limited to such a use. I may print positives from positives, or negatives from negatives, or positives from negatives on any type of continuous film band. The application to motion picture printing is taken merely for the sake of convenience.

The method of printing positives from negatives is illustrated in Figure 1. The developed negative film is fed from a reel N' and the raw positive from another reel P' through a printer 9. This printer is not illustrated in any detail in the drawings as it forms no part of my present invention. This printer may be of any well known type, either a contact printer or a projection printer. The light source L illuminates the film P through the film N, in the printer 9, the intensity of the source L being adjusted to give just slightly more light than is necessary to print the densest negative likely to be met with in practice. All negatives are printed with this illumination regardless of their density. It will be evident that negatives less dense than the densest will all be over printed.

The films are kept in motion by suitable mechanical devices of well known types. At the printer 9 it will be necessary to have an intermittent feed, such as the ordinary claw pull-down shown at 12 in Figure 1. During the later stages of the travel of the film such as opposite the integrating bar 4 it will be desirable to have uniform motion, which may be provided by the ordinary sprocket feed. After passing through the printer the film P passes down into the tank 7 containing a desensitizing bath. The film N passes over suitable sprockets forming several loops. The length of these loops will be so adjusted that the travel of the film N from the pull-down 12 to the integrating bar 4 is exactly equal to the travel of the film P through the desensitizing bath up to the same point. In this way corresponding frames or picture areas on the two films N and P will be brought into juxtaposition at the integrating bar 4. This last is a rectangular bar of quartz or glass placed between the two films so that light transmitted by the optical systems 1, 2, 3 and the red filter F is passed through the image on the film N and then integrated by the bar 4. The bar 4 has at one or both ends a diffusing surface, such as a sheet of flashed opal or ground glass. (10 in Figure 1.) The action of the integrating bar 4 is to pass to the film P a field of light of uniform brightness which represents an integrated value of the light passed by the corresponding negative frame. Beyond the station 4 the film N passes to the take-up spool N", and the film P passes through the ordinary processing tank (8 and others not shown) where it is developed, fixed, and washed. After drying it is eventually wound on the positive take-up spool P", also not shown.

In the apparatus just described the film P is first printed from the negative N by white light in the printer 9. The film is then submitted to the action of a desensitizing bath in the tank 7 and is next passed to the integrating bar 4 where it is exposed to red light. The desensitizing bath or its equivalent is necessary to the successful operation of the method at useful speeds. This desensitizing bath may consist, for example, of the dye pinacryptol yellow at a concentration of 1 to 5,000 parts of water, or of 1 to 5,000 pinacryptol green in water with ½% of potassium bromide added.

The operation of the optical system comprising the elements 1, 2, 3, and 4, will be apparent from the arrangement shown in the drawings. The filter F will be preferably a rather deep red filter, such as the Wratten and Wainwright A filter mentioned. The light source L, as shown in Figure 1, serves the double purpose of exposing the film in the printer 9 to white light and also to red light through the integrating bar 4. If desirable, however, two light sources may be used, one to illuminate the printer 9 and a second to illuminate the integrating bar. As stated, this integrating bar 4 is a rectangular bar of glass or quartz and it is mounted between the two films with the ends in close proximity to each of the films. Quartz, under some conditions, is preferred as the material for constructing this bar 4 because it has the physical property of high transmission and therefore gives higher efficiency. The bright image of the film N is completely broken up by internal reflection in passing through the bar 4, resulting in a uniform integrated value transmitted to the film P. After immersion in the desensitizing bath the action of the red light at 4 "bleaches" or lessens the amount of the latent image before its development in the tank 8. The result is that an overexposure of white light given originally in the printer 9 is bleached to the right and controlled extent by the action of red light at the integrating bar.

A number of variations besides those already suggested may be made in the apparatus of Figure 1. Instead of the integrating bar 4 made of quartz or glass, for example, an equivalent device such as a mirror tunnel may be used.

As illustrated, the apparatus will be capable of only relatively slow speeds, as a slow rate of travel of the film P past the integrating bar 4 is necessary under the conditions shown to insure sufficient red light exposure at that point. This exposure can be increased and the rate of travel of the film, and, consequently, the speed of the entire apparatus, can be speeded up by a change in the construction at the integrating station 4. Two or more quartz or glass bars can be used, one beside the other, or one large quartz or glass block may be used. The latter is, however, not as satisfactory as the use of several smaller bars or blocks. It is understood, of course, that these changes would necessitate a corresponding change in the optical system 1, 2, 3.

It should be mentioned that at the station 4, it is necessary to avoid any light getting through the perforations of the film as this would upset the operation of the method.

As stated, one light source is preferable, as shown in the drawings, but two separate light sources may be employed if desired. The intensity of the light source L will be regulated so as to give just a little more exposure than is necessary to print the densest area of the film in the printer 9. If two light sources are used, their intensities will each be regulated independently of the other.

The intensity of the red light at the station 4 must be regulated so that the intensity of red light through the densest film will just slightly bleach the latent image of the print made from it. This will be evident from a careful consideration of the process.

As seen in the drawings, one diffusing screen 10 is shown at the upper end of the integrating bar 4, but such screens may be used at both ends. Flashed opal glass will be a preferable form of such a diffusing screen since it gives maximum diffusion for given transmission. However, ground glass may be used.

One of the advantages of the method and apparatus illustrated is that the lamp L is burned at constant brightness and no judgment on the part of the operator is required, as is the case in most commercial printers where the operator is required to change the exposure from scene to scene.

The method and apparatus as described are, of course, limited as to the range over which they function perfectly. This range is determined by the density range of the film being printed. However, the method works very well from the thinnest densities to a density of about 2.00 or more in the negative and this range is sufficient for most practical uses. The method will naturally be most successful when the negative density range is restricted and in most cases it will be possible to keep the development of the negative within the range mentioned. It will be desirable to use negatives not showing too great contrast, that is "soft" negatives, because this enables the process to handle successfully a greater range of camera exposures.

Another variation of the invention is illustrated in Fig. 2. This modification will be useful where negatives are to be made from negatives or positives from positives. The apparatus consists largely of the same elements as before with modifications in the arrangement. The films N and P, in this case (Fig. 2) first pass the integrating station 4 where the film P is uniformly fogged with white light transmitted by the film N to the film P. The filter F in this case is not in the path of the light from the light source L through the optical system 1, 2, 3, but is now located between the light source L and the film in the printer 15. Consequently, the optical system 1, 2, 3 transmits white light through the picture area on N through the integrating bar 4 to the film P. After passing the latter point, the film P next goes through the tank 7 of desensitizing bath and then passes up to the projection printer 15. It will be desirable to partially remove surface moisture from the film P between the desensitizing tank and the printer. This may be accomplished by squeegeeing rollers (not shown) and by blowing on jets of air as shown by the nozzle 19. The image bearing film N passes over a series of sprockets arranged to form several loops, and as before the length of travel between the station 4 and the printing gate in 15 will be exactly the same for the two films N and P. In the projection printer 15 the film is printed by red light transmitted by the light source L through the filter F, the image area on N, and the lens 16, to the film on P, which was fogged by integrated white light transmitted by the same image area on N. After being printed with red light in 15 the film then passes to the usual developing and processing tanks 8 and others not shown.

The method of the second arrangement is in every essential similar to that of the first. The film is first given an exposure to white light, is desensitized, and then given an exposure to red light which is controlled by the image bearing film. By the second method positives from positives or negatives from negatives will be obtained.

No reference has been made to the method of processing the film as developers, fixing baths, apparatus, and general procedure for carrying out these steps are well known, and many formulas are available in the literature.

It will be apparent that variations, modifications, and equivalents may be used in the method and in the apparatus as shown without departing from the scope of the invention as expressed in the appended claims.

What I claim is:

1. In a process of making a print on a continuous sensitive band from another band carrying images, the steps of exposing the first band to an actinic light from the second band, submitting the sensitive band to the action of a desensitizing bath, and then exposing the sensitive band area by area to a non-actinic light capable of lessening the effect of the first exposure, the intensity of the second exposure being controlled by the corresponding area of the image carrying band from which the first exposure was made.

2. In a process of making a print on a continuous sensitive band from another band carrying images, the steps of exposing the first band to printing light from the second band sufficient to print satisfactorily from the densest image thereon, submitting the sensitive band to the action of a desensitizing bath, and then exposing the sensitive band area by area to a non-actinic light capable of lessening the effect of the first exposure, the intensity of the second exposure being controlled by the corresponding area of the image carrying band from which the first exposure was made.

3. The method of automatically printing a motion picture film from a separate photographic record which comprises giving the said film an overexposure of actinic light, submitting said film to the action of a desensitizing bath, and then lessening the effect of such overexposure by a second exposure to red light, the amount of said second exposure being controlled by the transmission of the particular picture area from which the said film was printed.

4. The method of automatically printing a motion picture film from a separate photographic record which comprises giving the said film an overexposure to actinic light, submitting said film to the action of a bath containing a desensitizing dye, and then lessening the effect of such overexposure by a second exposure to red light, the amount of second exposure being controlled by the transmission of the particular picture area from which the said film was printed.

5. In a machine for continuously printing from one band upon a second band, means for directing each of the bands past each of the stations, means at each of the stations for directing light from the first band to the second band, the light at one station being actinic and the light at the other station being non-actinic, and the directing means at one station giving a diffuse integrated light and at the other station printing a sharp image.

6. In a machine for continuously printing from one band upon a second band, means for directing each of the bands past each of the stations, means at each of the stations for directing light from the first band to the second band, the light at one station being actinic and the light at the other station being non-actinic, and the directing means at one station giving a diffuse integrated light and at the other station printing a sharp image, and means for intermittently moving the bands past the last named station.

7. In a machine for continuously printing from one band upon a second band, means for directing each of the bands past each of the stations, means for each of the stations for directing light from the first band to the second band, the light at one station being actinic and the light at the other station being non-actinic, means between the stations for desensitizing the second band, and the directing means at one station giving a diffuse integrated light and at the other station printing a sharp image.

8. In a machine for continuously printing from one band upon a second band, means for directing each of the bands past each of the stations, means at each of the stations for directing light from the first band to the second band, the light at one station being actinic and the light at the other station being non-actinic, means between the stations for desensitizing the second band, and the directing means at one station giving a diffuse integrated light and at the other station printing a sharp image, and means for intermittently moving the bands past the last named station.

Signed at Rochester, New York, this 13th day of April 1931.

JOHN G. CAPSTAFF.